US009729783B2

(12) United States Patent
Lin (10) Patent No.: US 9,729,783 B2
(45) Date of Patent: Aug. 8, 2017

(54) ELECTRONIC DEVICE AND METHOD FOR CAPTURING IMAGES USING REAR CAMERA DEVICE

(71) Applicant: Chiun Mai Communication Systems, Inc., New Taipei (TW)

(72) Inventor: Chin-Yu Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/794,377

(22) Filed: Jul. 8, 2015

(65) Prior Publication Data

US 2016/0105603 A1    Apr. 14, 2016

(30) Foreign Application Priority Data

Oct. 14, 2014 (CN) .......................... 2014 1 0542860

(51) Int. Cl.
*H04N 5/232* (2006.01)
*H04N 5/225* (2006.01)
*G06K 9/00* (2006.01)

(52) U.S. Cl.
CPC ..... *H04N 5/23219* (2013.01); *G06K 9/00604* (2013.01); *H04N 5/2258* (2013.01)

(58) Field of Classification Search
None
See application file for complete search history.

(56) References Cited

U.S. PATENT DOCUMENTS

| 2009/0087097 A1* | 4/2009 | Suehiro | G06K 9/00281 382/190 |
| 2009/0147141 A1* | 6/2009 | Lee | G06K 9/00221 348/576 |
| 2009/0284799 A1* | 11/2009 | Matsuhira | G06K 9/00248 358/3.24 |
| 2009/0322897 A1* | 12/2009 | Park | H04N 5/232 348/222.1 |
| 2010/0022271 A1* | 1/2010 | Kang | H04M 1/2745 455/556.1 |
| 2013/0235346 A1* | 9/2013 | Huang | A61B 3/152 351/208 |
| 2014/0015918 A1* | 1/2014 | Six | H04N 7/144 348/14.16 |
| 2015/0301559 A1* | 10/2015 | Wu | F16M 11/041 248/229.16 |

* cited by examiner

*Primary Examiner* — Albert Cutler
(74) *Attorney, Agent, or Firm* — Steven Reiss (57) ABSTRACT

A method of capturing images includes obtaining a first image of a user captured by a front camera device of an electronic device. First coordinates of two eyes of the user in the first image are identified. A preview image of the user from a rear camera device of the electronic device is obtained, and second coordinates of the two eyes of the user in the preview image are identified. At least one difference value is calculated according to the first coordinates and the second coordinates of the two eyes of the user. Once each of the at least one difference value is within a corresponding predetermined range, the rear camera device is controlled to capture a second image of the user.

15 Claims, 6 Drawing Sheets

ELECTRONIC DEVICE AND METHOD FOR CAPTURING IMAGES USING REAR CAMERA DEVICE

CROSS-REFERENCE TO RELATED APPLICATIONS

This application claims priority to Chinese Patent Application No. 201410542860.8 filed on Oct. 14, 2014, the contents of which are incorporated by reference herein.

FIELD

The subject matter herein generally relates to image capturing technology, and particularly to an electronic device and a method for capturing images using the electronic device.

BACKGROUND

An electronic device can capture images using either a front camera device and or a rear camera device. Usually, a configuration, such as a resolution, of the rear camera device is better than a configuration of the front camera device, thus, images captured by the front camera device have lower quality than the images captured by the rear camera device.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 1:
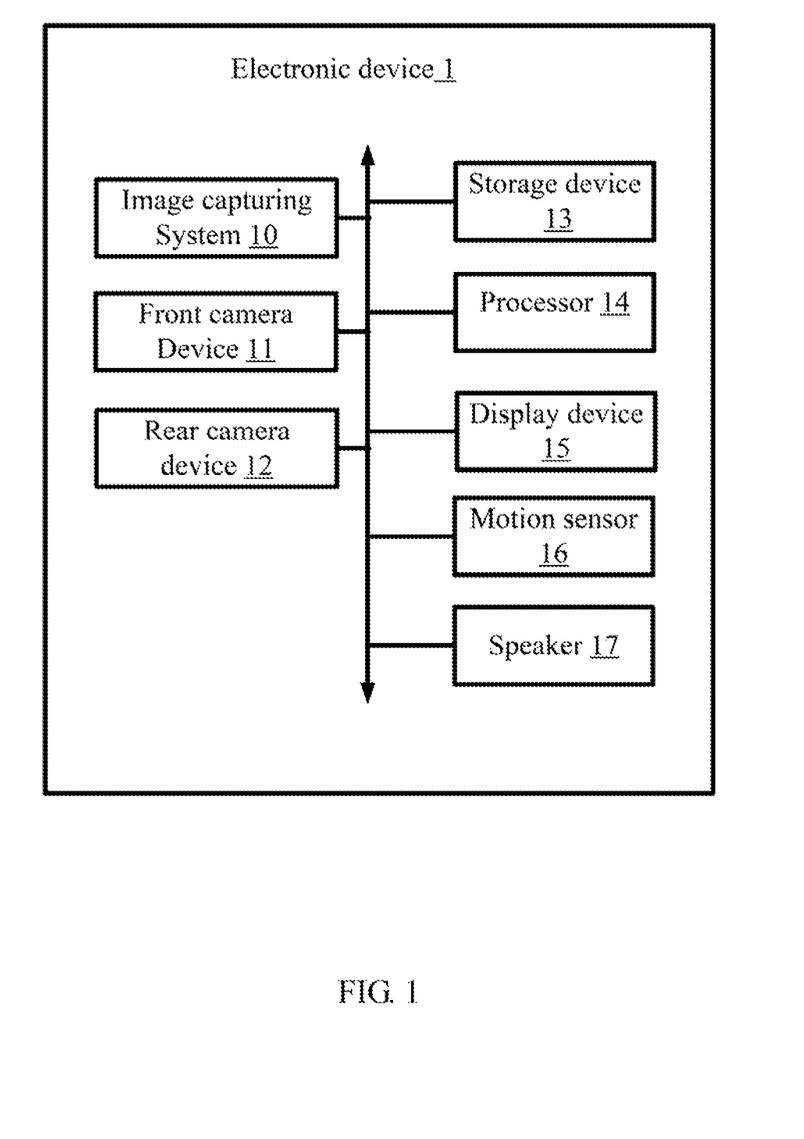
FIG. 1 is a block diagram of one embodiment of an electronic device including an image capturing system.

FIG. 1 is a block diagram of one embodiment of an electronic device. Depending on the embodiment, an electronic device 1 includes an image capturing system 10, a front camera device 11, a rear camera device 12, a storage device 13, at least one processor 14, a display device 15, a motion sensor 16 and a speaker 17. The electronic device 1 can be a smart phone, a personal digital assistant (PDA), a tablet computer, or any other suitable electronic device. FIG. 1 illustrates only one example of the electronic device 1 that can include more or fewer components than illustrated, or have a different configuration of the various components in other embodiments.

The front camera device 11 and the display device 15 are installed in the front side of the electronic device 1, and the rear camera device 12 is installed in a reverse side opposite to the front side of the electronic device 10. Both the front camera device 11 and the rear camera device 12 can capture images. In one embodiment, a resolution of the rear camera device 12 is higher than that of the front camera device 11.

The storage device 13 can be used to store information of the electronic device 1. For example, the storage device 13 stores the images captured by the front camera device 11 and/or the images captured by the rear camera device 12. In one embodiment, the storage device 13 can be an internal storage device, such as a flash memory, a random access memory (RAM) for temporary storage of information, and/or a read-only memory (ROM) for permanent storage of information. The storage device 13 can also be an external storage device, such as an external hard disk, a storage card, or a data storage medium.

The at least one processor 14 can be a central processing unit (CPU), a microprocessor, or other data processor chip that performs functions of the electronic device 1. The display device 15 can be a touch screen, which can be used to display information such as the images of the electronic device 1.

The motion sensor 16 can include at least one of an accelerometer, a gyroscope sensor, and an electronic compass. In one embodiment, the motion sensor 16 can be used to sense current orientation angle of the electronic device 1 relative to a predetermined orientation such as the direction of the gravity or the direction of the local magnetic field of the Earth.

The speaker 17 can be used to output audio information. For example, the speaker 17 can be used to output a preset voice message or a preset sound message.

The image capturing system 10 can control the rear camera device 12 to capture an image based on an image captured by the front camera device 11. Details will be given in the following paragraphs.

Figure 2:
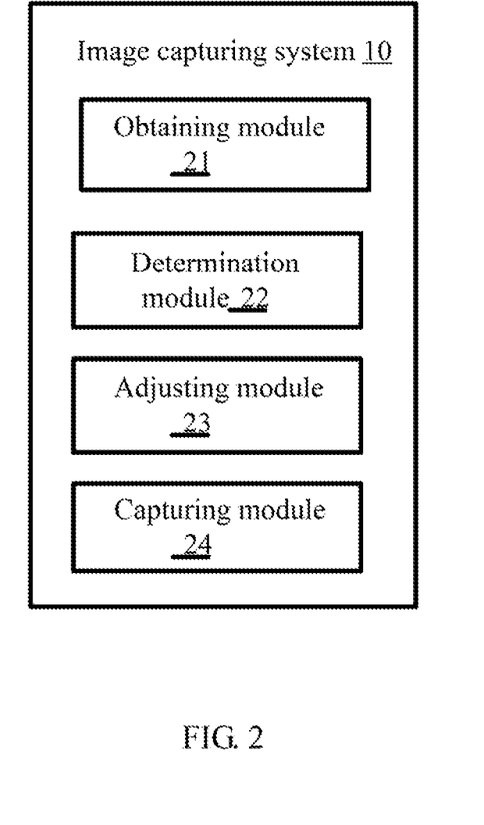
FIG. 2 is a block diagram of one embodiment of functional modules of the image capturing system.

FIG. 2 is a block diagram of one embodiment of functional modules of the image capturing system 10. In at least one embodiment, the image capturing 10 can include an obtaining module 21, a determination module 22, an adjusting module 23, and a capturing module 24. The function modules 21-24 can include computerized codes in the form of one or more programs, which are stored in the storage device 13, and are executed by the at least one processor 14 of the electronic device 1 to provide functions of capturing an image using the rear camera device 12 based on an image that is captured by the front camera device 11

The obtaining module 21 can obtain a first image of a user captured by the front camera device 11.

In one embodiment, the obtaining module 21 controls the front camera device 11 to capture the first image of the user. In other embodiments, the obtaining module 21 obtains the first image of the user from the storage device 13, which pre-stores a plurality of images of the user.

Figure 4:
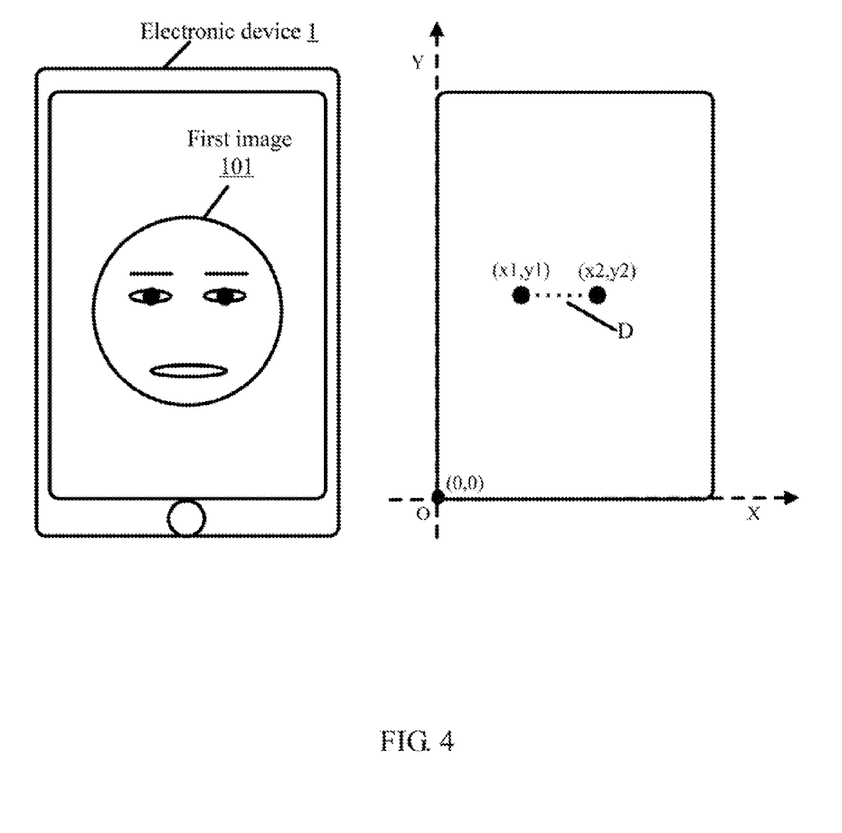
FIG. 4 illustrates one example of a first image captured by a front camera device of the electronic device of FIG. 1.

In one example, the obtaining module 21 obtains the first image 101 as shown in FIG. 4.

Figure 5:
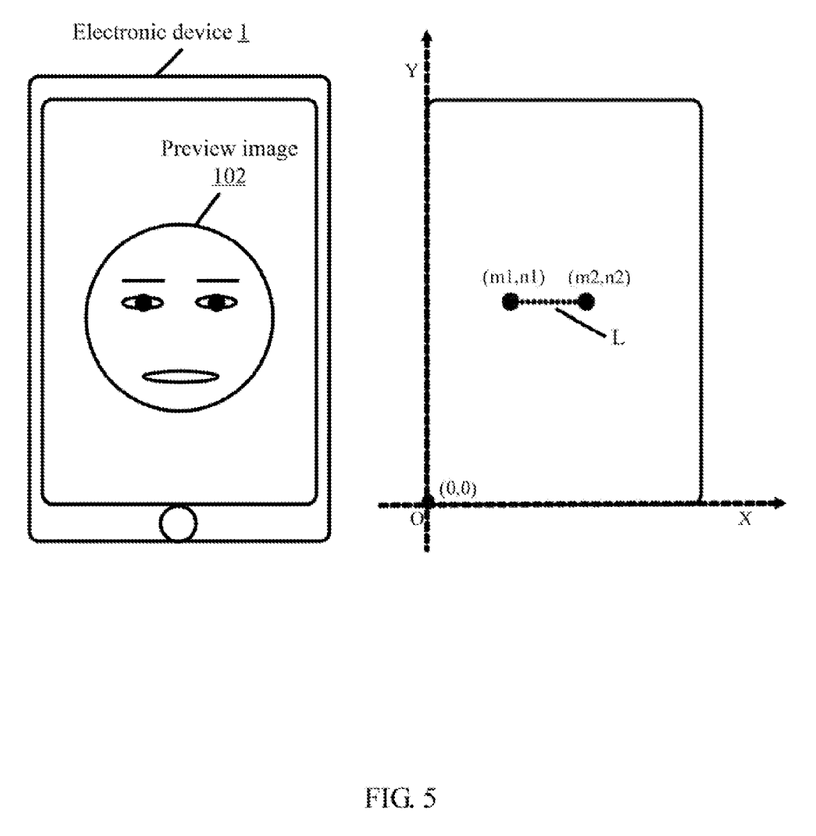
FIG. 5 illustrates one example of a preview image obtained from a rear camera device of the electronic device of FIG. 1.
Figure 6:
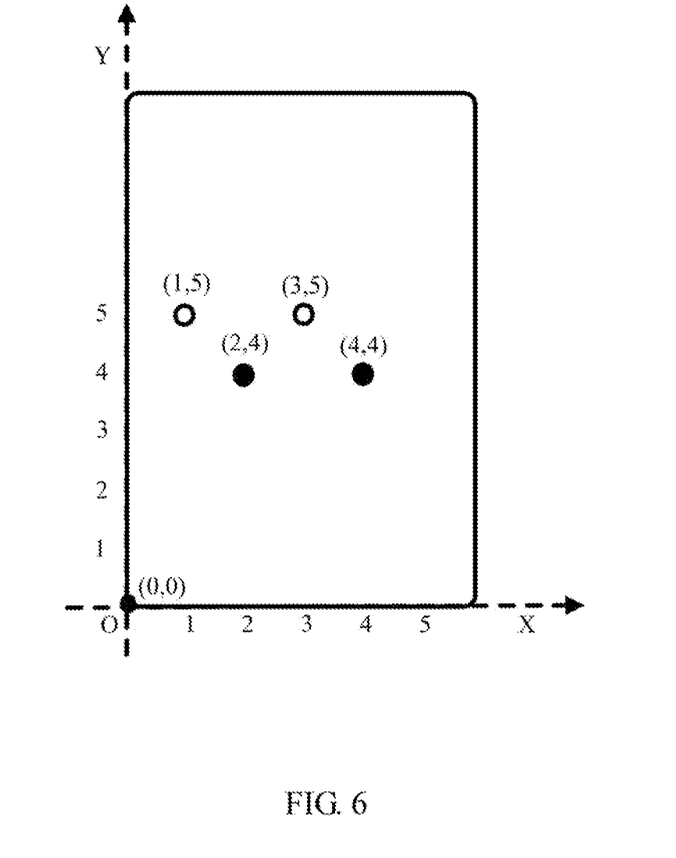
FIG. 6 illustrates one example of adjusting a position of the electronic device of FIG. 1.

The determination module 22 can identify the first coordinates of two eyes of the user in the first image under a coordinate system of the display device 15. In one embodiment, the determination module 22 can construct the coordinate system such as illustrated in FIGS. 4-6, by setting a lower left corner of the display device 15 as an origin of the coordinate system, setting a bottom side of the display device 15 as an X-axis, and setting a left side of the display device 15 as a Y-axis.

The determination module 22 first recognizes the two eyes of the user in the first image using predetermined image recognition technologies, and then identifies the first coordinates of the two eyes of the user in the first image under the coordinated system. In one embodiment, the image recognition technologies includes, but are not limited to, a region division method, a blur processing method, and an edge detection technology.

For example, as shown in FIG. 4, the first coordinates of the two eyes of the user in the first image 101 can be "(x1, y1)" and "(x2, y2)".

The obtaining module 21 can further obtain a preview image of the user captured by the rear camera device 12. In one example, the obtaining module 21 obtains a preview image 102 from the rear camera device 12 as shown in FIG. 5. In addition, the determination module 22 can identify second coordinates of the two eyes of the user in the preview image under the coordinate system of the display device 15.

Similar to above, the determination module 22 recognizes the two eyes of the user in the preview image using the predetermined image recognition technologies, and then identifies the second coordinates of the two eyes of the user in the preview image under the coordinated system.

In one example, as shown in FIG. 5, the second coordinates of the two eyes of the user in the preview image 102 can be "(m1, n1)" and "(m2, n2)".

The determination module 22 can calculate at least one difference value according to the first coordinates and the second coordinates of the two eyes of the user. Each of the at least one difference value is corresponding to a predetermined range.

In one embodiment, the at least one difference value can include a distance difference value obtained by subtracting a first distance value between the two eyes of the user in the first image from a second distance value between the two eyes of the user in the preview image. The predetermined range corresponding to the distance difference value is a predetermined distance difference range.

For example, the determination module 22 can obtain a first distance value "D" between the two eyes of the user in the first image 101 by calculating "D"=$\sqrt{(x1-x2)^2+(y1-y2)^2}$. The determination module 22 can obtain a second distance value "L" between the two eyes of the user in the preview image 102, by calculating "L"=$\sqrt{(m1-m2)^2+(n1-n2)^2}$. Then the determination module 22 can obtain a distance difference value that equals "L"-"D".

The at least one difference value can include a horizontal coordinate difference value and a vertical coordinate difference value between the first coordinates and the second coordinates of the two eyes of the user. The predetermined range corresponding to the horizontal coordinate difference value is a predetermined horizontal coordinate difference range. The predetermined range corresponding to the vertical coordinate difference value is a predetermined vertical coordinate difference range.

In one embodiment, the determination module 22 can calculate a first average coordinate of the first coordinates of the two eyes of the user in the first image. The determination module 22 can calculate a second average coordinate of the second coordinates of the two eyes of the user in the preview image. Then the determination module 22 can obtain the horizontal ordinate difference value by subtracting a horizontal coordinate of the second average coordinate from a horizontal coordinate of the first average coordinate. The determination module 22 can obtain the vertical coordinate difference value by subtracting a vertical coordinate of the second average coordinate from a vertical coordinate of the first average coordinate.

In one embodiment, the at least one difference value can include an orientation angle difference value. The determination module 22 can obtain the orientation angle difference value by calculating an angel between a first line connecting the first coordinates of the two eyes of the user and a second line connecting the second coordinates of the two eyes of the user. The predetermined range corresponding to the orientation angle difference value is a predetermined orientation angle difference range.

In another embodiment, the motion sensor 16 can be used to sense the current orientation angle of the electronic device 1 relative to a predetermined orientation such as the direction of the gravity or the direction of the local magnetic field of the Earth, which enables an alternative definition of the orientation angle difference value. In this embodiment, the determination module 22 can obtain a first orientation angle of the electronic device 1 relatives to the predetermined orientation from the motion sensor 16 of the electronic device 1 when the front camera device 11 of the electronic device 1 captures the first image. The determination module 22 can obtain a second orientation angle of the electronic device 1 relatives to the predetermined orientation from the motion sensor 16 of the electronic device 1 when the rear camera device 12 of the electronic device 1 obtains the preview image. Then the determination module 22 can obtain the orientation angle difference value by subtracting the first orientation angle from the second orientation angle. The predetermined range corresponding to the orientation angle difference value is a predetermined orientation angle difference range.

For example, the predetermined orientation is the direction of the gravity. The determination module 22 obtains a first orientation angle "0" when the electronic device 1 captures the first image under a vertical orientation, and obtains a second orientation angle "90" when the electronic device 1 obtains the preview image under a horizontal orientation. Then the determination module 22 obtains an orientation angle difference value "90".

The determination module 22 can determine whether each of the at least one difference value is within the corresponding predetermined range. When at least one difference value is not within the corresponding predetermined range, the adjusting module 23 can prompt the user to move the electronic device 1 according to the at least one difference value not within the corresponding predetermined range. In one embodiment, the adjusting module 23 can prompt the user by outputting a corresponding voice message or sound message via the speaker 17.

In a first example, when the distance difference value is not within a predetermined distance difference range (e.g., [−2, 2]) and the distance difference value is smaller than 0, the adjusting module 23 can prompt the user to decrease a distance between the user and the electronic device 1. When the distance difference value is not within the predetermined distance difference range and the distance difference value is greater than 0, the adjusting module 23 can prompt the user to increase the distance between the user and the electronic device 1.

In a second example, the adjusting module 23 can prompt the user to move the electronic device 1 according to whether the horizontal coordinate difference value is greater than or less than 0 when the horizontal coordinate difference value is not within a predetermined horizontal coordinate difference range. The adjusting module 23 can prompt the user to move the electronic device 1 according to whether the vertical coordinate difference value is greater than or less than 0 when the vertical coordinate difference value is not within a predetermined vertical coordinate difference range.

When the horizontal ordinate difference value is great than 0 and the vertical coordinate difference value is great than 0, the adjusting module 23 can prompt the user to move the electronic device 1 upwards on an XOY plane by a third distance value, and rightwards on the XOY plane by a fourth distance value. The third distance value is equal to an absolute value of the vertical coordinate difference value, and the fourth distance value is equal to an absolute value of the horizontal ordinate difference value. The adjusting module 23 can construct the XOY plane based on the X-axis, the origin, and the Y-axis of the coordinate system such as illustrated in FIGS. 4-6.

When the horizontal ordinate difference value is great than 0 and the vertical coordinate difference value is less than 0, the adjusting module 23 can prompt the user to move the electronic device 1 downwards on the XOY plane by the third distance value, and rightwards on the XOY plane by the fourth distance value.

When the horizontal ordinate difference value is less than 0 and the vertical coordinate difference value is less than 0, the adjusting module 23 can prompt the user to move the electronic device 1 downwards on the XOY plane by the third distance value, and leftwards on the XOY plane by the fourth distance value.

When the horizontal ordinate difference value is less than 0 and the vertical coordinate difference value is great than 0, the adjusting module 23 can prompt the user to move the electronic device 1 upwards on the XOY plane by the third distance value, and leftwards on the XOY plane by the fourth distance value.

For example, the horizontal coordinate difference value is "−1" and the vertical coordinate difference value is "1", based on the first coordinates "(1, 5)" and "(3, 5)" of the two eyes of the user and the second coordinates "(2, 4)" and "(4, 4)" of the two eyes of the user, the adjusting module 23 prompts the user to move the electronic device 1 upwards on the XOY plane by 1 centimeter, and move the electronic device 1 leftwards on the XOY plane by 1 centimeter.

In a third example, the adjusting module 23 can prompt the user to rotate the electronic device 1 clockwise or counter-clockwise according to whether the orientation angle difference value is greater than or less than 0 when the orientation angle difference value is not within a predetermined orientation angle difference range. When the orientation angle difference value is greater than 0, the adjusting module 23 can prompt the user to rotate the electronic device 1 clockwise by an absolute value of the orientation angle difference value. When the orientation angle difference value is less than 0, the adjusting module 23 can prompt the user to rotate the electronic device 1 counter-clockwise by the absolute value of the orientation angle difference value.

The capturing module 24 can control the rear camera device 12 to capture a second image of the user when each of the at least one difference value is within the corresponding predetermined range.

Figure 3:
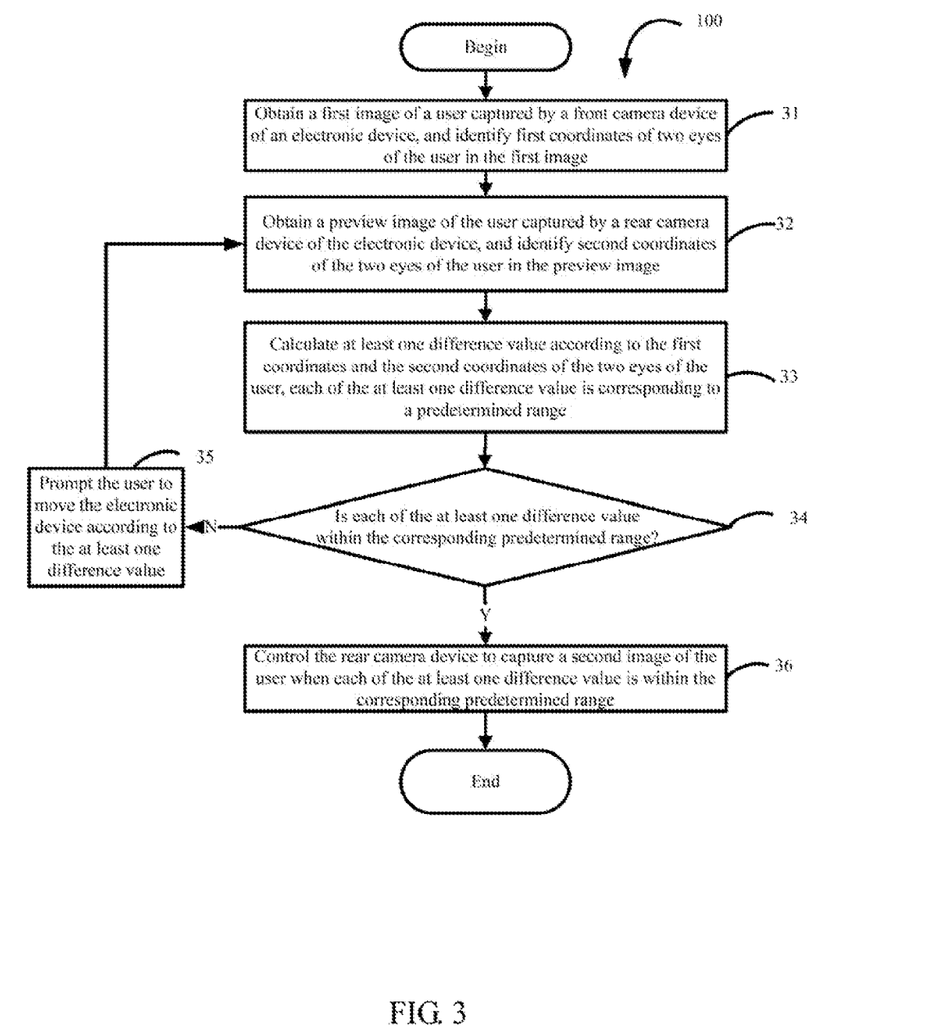
FIG. 3 illustrates a flowchart of one embodiment of a method for capturing images using the electronic device of FIG. 1.

FIG. 3 illustrates a flowchart is presented in accordance with an example embodiment. The example method 100 is provided by way of example, as there are a variety of ways to carry out the method. The method 100 described below can be carried out using the configurations illustrated in FIG. 1, for example, and various elements of these figures are referenced in explaining example method 100. Each block shown in FIG. 3 represents one or more processes, methods or subroutines, carried out in the exemplary method 100. Additionally, the illustrated order of blocks is by example only and the order of the blocks can be changed according to the present disclosure. The exemplary method 100 can begin at block 31. Depending on the embodiment, additional steps can be added, others removed, and the ordering of the steps can be changed.

At block 31, an obtaining module can obtain a first image of a user captured by a front camera device of an electronic device.

In one embodiment, the user holds the electronic device such that the user faces the front camera device of the electronic device and the obtaining module controls the front camera device to capture the first image of the user. In other embodiments, the obtaining module obtains the first image of the user from a storage device of the electronic device, which pre-stores a plurality of images of the user.

In one example, the obtaining module obtains the first image as shown in FIG. 4.

A determination module can identify first coordinates of two eyes of the user in the first image under a coordinate system of a display device of the electronic device.

In one embodiment, the determination module can construct the coordinate system such as illustrated in FIGS. 4-6, by setting a lower left corner of a display device of the electronic device as an origin of the coordinate system, setting a bottom side of the display device as an X-axis, and setting a left side of the display device as a Y-axis.

The determination module first recognizes the two eyes of the user of the first image using predetermined image recognition technologies, and then identifies the first coordinates of the two eyes of the user of the first image under the coordinated system. In one embodiment, the image recognition technologies includes, but are not limited to, a region division method, a blur processing method, and an edge detection technology.

For example, as show in FIG. 4, the first coordinates of the two eyes of the user of the first image can be "(x1, y1)" and "(x2, y2)".

At block 32, the user holds the electronic device such that the user faces a rear camera device of the electronic device and the obtaining module can further obtain a preview image of the user captured by the rear camera device of the electronic device. In one example, the obtaining module obtains a preview image from the rear camera device as shown in FIG. 5. In addition, the determination module can identify second coordinates of the two eyes of the user in the preview image under the coordinate system of the display device.

Similar to above, the determination module recognizes the two eyes of the user in the preview image using the predetermined image recognition technologies, and then identifies the second coordinates of the two eyes of the user in the preview image under the coordinated system.

In one example, as shown in FIG. 5, the second coordinates of the two eyes of the user in the preview image can be "(m1, n1)" and "(m2, n2)".

At block 33, the determination module can calculate at least one difference value according to the first coordinates and the second coordinates of the two eyes of the user. Each of the at least one difference value is corresponding to a predetermined range.

In one embodiment, the at least one difference value can include a distance difference value obtained by subtracting a first distance value between the two eyes of the user in the first image, from a second distance value between the two eyes of the user in the preview image. The predetermined range corresponding to the distance difference value is a predetermined distance difference range.

For example, the determination module can obtain a first distance value "D" between the two eyes of the user in the first image by calculating "D"=$\sqrt{(x1-x2)^2+(y1-y2)^2}$. The determination module can obtain a second distance value "L" between the two eyes of the user in the preview image, by calculating "L"=$\sqrt{(m1-m2)^2+(n1-n2)^2}$. Then the determination module can obtain a distance difference value that equals "L"-"D".

The at least one difference value can include a horizontal coordinate difference value and a vertical coordinate difference value between the first coordinates and the second coordinates of the two eyes of the user. The predetermined range corresponding to the horizontal coordinate difference value is a predetermined horizontal coordinate difference range. The predetermined range corresponding to the vertical coordinate difference value is a predetermined vertical coordinate difference range.

In one embodiment, the determination module can calculate a first average coordinate of the first coordinates of the two eyes of the user in the first image. The determination module can calculate a second average coordinate of the second coordinates of the two eyes of the user in the preview image. Then the determination module can obtain the horizontal ordinate difference value by subtracting a horizontal coordinate of the second average coordinate from a horizontal coordinate of the first average coordinate. The determination module can obtain the vertical coordinate difference value by subtracting a vertical coordinate of the second average coordinate from a vertical coordinate of the first average coordinate.

In one embodiment, the at least one difference value can include an orientation angle difference value. The determination module 22 can obtain the orientation angle difference value by calculating an angel between a first line connecting the first coordinates of the two eyes of the user and a second line connecting the second coordinates of the two eyes of the user. The predetermined range corresponding to the orientation angle difference value is a predetermined orientation angle difference range.

In another embodiment, a the motion sensor of the electronic device can be used to sense the current orientation angle of the electronic device relative to a predetermined orientation such as the direction of the gravity or the direction of the local magnetic field of the Earth, which enables an alternative definition of the orientation angle difference value. In this embodiment, the determination module can obtain a first orientation angle of the electronic device relatives to the predetermined orientation from the motion sensor of the electronic device when the front camera device of the electronic device captures the first image. The determination module can obtain a second orientation angle of the electronic device relatives to the predetermined orientation from the motion sensor of the electronic device when the rear camera device of the electronic device obtains the preview image. Then the determination module can obtain the orientation angle difference value by subtracting the first orientation angle from the second orientation angle. The predetermined range corresponding to the orientation angle difference value is a predetermined orientation angle difference range.

For example, the predetermined orientation is the direction of the gravity. The determination module obtains a first orientation angle "0" when the electronic device captures the first image under a vertical orientation, and obtains a second orientation angle "90" when the electronic device obtains the preview image under a horizontal orientation. Then the determination module obtains an orientation angle difference value "90".

At block 34, the determination module 22 can determine whether each of the at least one difference value is within the corresponding predetermined range. When at least one difference value is not within the corresponding predetermined range, the process goes to block 35. When each of the at least one difference value is within the corresponding predetermined rang, the process goes to block 36.

At block 35, an adjusting module can prompt the user to move the electronic device according to the at least one difference value not within the corresponding predetermined range. In one embodiment, the adjusting module can prompt the user by outputting a corresponding voice message or sound message via a speaker of the electronic device.

In a first example, when the distance difference value is not within a predetermined distance difference range (e.g., [−2, 2]), and the distance difference value is smaller than 0, the adjusting module can prompt the user to decrease a distance between the user and the electronic device. When the distance difference value is not within the predetermined distance difference range, and the distance difference value is greater than 0, the adjusting module can prompt the user to increase the distance between the user and the electronic device.

In a second example, the adjusting module can prompt the user to move the electronic device according to whether the horizontal coordinate difference value is greater than or less than 0 when the horizontal coordinate difference value is not within a predetermined horizontal coordinate difference range. The adjusting module can prompt the user to move the electronic device according to whether the vertical coordinate difference value is greater than or less than 0 when the vertical coordinate difference value is not within a predetermined vertical coordinate difference range.

When the horizontal ordinate difference value is great than 0 and the vertical coordinate difference value is great than 0, the adjusting module can prompt the user to move the electronic device upwards on an XOY plane by a third distance value, and rightwards on the XOY plane by a fourth distance value. The third distance value is equal to an absolute value of the vertical coordinate difference value, and the fourth distance value is equal to an absolute value of the horizontal ordinate difference value. The adjusting module can construct the XOY plane based on the X-axis, the origin, and the Y-axis of the coordinate system such as illustrated in FIGS. 4-6.

When the horizontal ordinate difference value is great than 0 and the vertical coordinate difference value is less than 0, the adjusting module can prompt the user to move the electronic device downwards on the XOY plane by the third distance value, and rightwards on the XOY plane by the fourth distance value.

When the horizontal ordinate difference value is less than 0 and the vertical coordinate difference value is less than 0, the adjusting module can prompt the user to move the electronic device downwards on the XOY plane by the third distance value, and leftwards on the XOY plane by the fourth distance value.

When the horizontal ordinate difference value is less than 0 and the vertical coordinate difference value is great than 0, the adjusting module can prompt the user to move the electronic device upwards on the XOY plane by the third distance value, and leftwards on the XOY plane by the fourth distance value.

For example, the horizontal coordinate difference value is "−1" and the vertical coordinate difference value is "1", based on the first coordinates "(1, 5)" and "(3, 5)" of the two eyes of the user and the second coordinates "(2, 4)" and "(4, 4)" of the two eyes of the user, the adjusting module prompts the user to move the electronic device upwards on the XOY plane by 1 centimeter, and move the electronic device leftwards on the XOY plane by 1 centimeter.

In a third example, the adjusting module can prompt the user to rotate the electronic device clockwise or counter-clockwise according to whether the orientation angle difference value is greater than or less than 0 when the orientation angle difference value is not within a predetermined orientation angle difference range. when the orientation angle difference value is greater than 0, the adjusting module can prompt the user to rotate the electronic device clockwise by an absolute value of the orientation angle difference value. When the orientation angle difference value is less than 0, the adjusting module can prompt the user to rotate the electronic device counter-clockwise by the absolute value of the orientation angle difference value.

At block 36, a capturing module can control the rear camera device to capture a second image of the user when each of the at least one difference value is within the corresponding predetermined range.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An image capturing method executed by at least one processor of an electronic device, comprising:
   obtaining a first image of a user captured by a front camera device of the electronic device;
   identifying first coordinates of two eyes of the user in the first image;
   obtaining a preview image of the user captured by a rear camera device of the electronic device;
   identifying second coordinates of the two eyes of the user in the preview image;
   calculating at least one difference value according to the first coordinates and the second coordinates of the two eyes of the user, wherein each of the at least one difference value is corresponding to a predetermined range;
   prompting the user to move the electronic device according to the at least one difference value; and
   controlling the rear camera device to capture a second image of the user when each of the at least one difference value is within the corresponding predetermined range;
   wherein the at least one difference value comprises a horizontal coordinate difference value and a vertical coordinate difference value between the first coordinates and the second coordinates of the two eyes of the user;
   wherein the horizontal coordinate difference value and the vertical coordinate difference value are obtained by:
   calculating a first average coordinate of the first coordinates of the two eyes of the user in the first image;
   calculating a second average coordinate of the second coordinates of the two eyes of the user in the preview image;
   obtaining the horizontal coordinate difference value by subtracting a horizontal coordinate of the second average coordinate from a horizontal coordinate of the first average coordinate; and
   obtaining the vertical coordinate difference value by subtracting a vertical coordinate of the second average coordinate from a vertical coordinate of the first average coordinate.

2. The method according to claim 1, wherein the at least one difference value comprises a distance difference value obtained by subtracting a first distance value between the two eyes of the user in the first image from a second distance value between the two eyes of the user in the preview image, the predetermined range corresponding to the distance difference value is a predetermined distance difference range, the step of prompting the user to move the electronic device comprises:
   prompting the user to adjust a distance between the user and the electronic device according to the distance difference value when the distance difference value is not within the predetermined distance difference range.

3. The method according to claim 1, wherein the predetermined range corresponding to the horizontal coordinate difference value is a predetermined horizontal coordinate difference range, the predetermined range corresponding to the vertical coordinate difference value is a predetermined vertical coordinate difference range, the step of prompting the user to move the electronic device comprises:
   prompting the user to move the electronic device according to the horizontal coordinate difference value when the horizontal coordinate difference value is not within the predetermined horizontal coordinate difference range; and prompting the user to move the electronic device according to the vertical coordinate difference value when the vertical coordinate difference value is not within the predetermined vertical coordinate difference range.

4. The method according to claim 1, wherein the at least one difference value comprises an orientation angle difference value obtained by calculating an angle between a first line connecting the first coordinates of the two eyes of the user and a second line connecting the second coordinates of the two eyes of the user, the predetermined range corresponding to the orientation angle difference value is a predetermined orientation angle difference range, the step of prompting the user to move the electronic device comprises:

prompting the user to rotate the electronic device according to the orientation angle difference value when the orientation angle difference value is not within the predetermined orientation angle difference range.

5. The method according to claim 1, wherein the at least one difference value comprises an orientation angle difference value obtained by subtracting a first orientation angle of the electronic device relative to a predetermined orientation obtained when the front camera device captures the first image from a second orientation angle of the electronic device relative to the predetermined orientation obtained when the rear camera device captures the preview image, the predetermined range corresponding to the orientation angle difference value is a predetermined orientation angle difference range, the step of prompting the user to move the electronic device comprises:

prompting the user to rotate the electronic device according to the orientation angle difference value when the orientation angle difference value is not within the predetermined orientation angle difference range.

6. An electronic device comprising:

a front camera device and a rear camera device;

at least one processor;

a storage device that stores images, the storage device being configured to store one or more programs that, when executed by the at least one processor, cause the at least one processor to:

obtain a first image of a user captured by the front camera device;

identify first coordinates of two eyes of the user in the first image;

obtain a preview image of the user captured by the rear camera device;

identify second coordinates of the two eyes of the user in the preview image;

calculate at least one difference value according to the first coordinates and the second coordinates of the two eyes of the user, wherein each of the at least one difference value is corresponding to a predetermined range;

prompt the user to move the electronic device according to the at least one difference value; and control the rear camera device to capture a second image of the user when each of the at least one difference value is within the corresponding predetermined range;

wherein the at least one difference value comprises a horizontal coordinate difference value and a vertical coordinate difference value between the first coordinates and the second coordinates of the two eyes of the user;

wherein the horizontal coordinate difference value and the vertical coordinate difference value are obtained by:

calculating a first average coordinate of the first coordinates of the two eyes of the user in the first image;

calculating a second average coordinate of the second coordinates of the two eyes of the user in the preview image;

obtaining the horizontal coordinate difference value by subtracting a horizontal coordinate of the second average coordinate from a horizontal coordinate of the first average coordinate; and obtaining the vertical coordinate difference value by subtracting a vertical coordinate of the second average coordinate from a vertical coordinate of the first average coordinate.

7. The electronic device according to claim 6, wherein the at least one difference value comprises a distance difference value obtained by subtracting a first distance value between the two eyes of the user in the first image from a second distance value between the two eyes of the user in the preview image, the predetermined range corresponding to the distance difference value is a predetermined distance difference range, the step of prompting the user to move the electronic device comprises:

prompting the user to adjust a distance between the user and the electronic device according to the distance difference value when the distance difference value is not within the predetermined distance difference range.

8. The electronic device according to claim 6, wherein the predetermined range corresponding to the horizontal coordinate difference value is a predetermined horizontal coordinate difference range, the predetermined range corresponding to the vertical coordinate difference value is a predetermined vertical coordinate difference range, the step of prompting the user to move the electronic device comprises:

prompting the user to move the electronic device according to the horizontal coordinate difference value when the horizontal coordinate difference value is not within the predetermined horizontal coordinate difference range; and prompting the user to move the electronic device according to the vertical coordinate difference value when the vertical coordinate difference value is not within the predetermined vertical coordinate difference range.

9. The electronic device according to claim 6, wherein the at least one difference value comprises an orientation angle difference value obtained by calculating an angle between a first line connecting the first coordinates of the two eyes of the user and a second line connecting the second coordinates of the two eyes of the user, the predetermined range corresponding to the orientation angle difference value is a predetermined orientation angle difference range, the step of prompting the user to more the electronic device comprises:

prompting the user to rotate the electronic device according to the orientation angle difference value when the orientation angle difference value is not within the predetermined orientation angle difference range.

10. The electronic device according to claim 6, wherein the at least one difference value comprises an orientation angle difference value obtained by subtracting a first orientation angle of the electronic device relative to a predetermined orientation obtained when the front camera device captures the first image from a second orientation angle of the electronic device relative to the predetermined orientation obtained when the rear camera device captures the preview image, the predetermined range corresponding to the orientation angle difference value is a predetermined orientation angle difference range, the step of prompting the user to move the electronic device comprises:
prompting the user to rotate the electronic device according to the orientation angle difference value when the orientation angle difference value is not within the predetermined orientation angle difference range.

11. A non-transitory storage medium having stored thereon instructions that, when executed by a processor of an electronic device, causes the processor to perform a method for capturing images, the electronic device comprising a front camera device and a rear camera device, wherein the method comprises:
obtaining a first image of a user captured by the front camera device;
identifying first coordinates of two eyes of the user in the first image;
obtaining a preview image of the user captured by the rear camera device;
identifying second coordinates of the two eyes of the user in the preview image;
calculating at least one difference value according to the first coordinates and the second coordinates of the two eyes of the user, wherein each of the at least one difference value is corresponding to a predetermined range;
prompting the user to move the electronic device according to the at least one difference value; and
controlling the rear camera device to capture a second image of the user when each of the at least one difference value is within the corresponding predetermined range;
wherein the at least one difference value comprises a horizontal coordinate difference value and a vertical coordinate difference value between the first coordinates and the second coordinates of the two eyes of the user;
wherein the horizontal coordinate difference value and the vertical coordinate difference value are obtained by:
calculating a first average coordinate of the first coordinates of the two eyes of the user in the first image;
calculating a second average coordinate of the second coordinates of the two eyes of the user in the preview image;
obtaining the horizontal coordinate difference value by subtracting a horizontal coordinate of the second average coordinate from a horizontal coordinate of the first average coordinate; and
obtaining the vertical coordinate difference value by subtracting a vertical coordinate of the second average coordinate from a vertical coordinate of the first average coordinate.

12. The non-transitory storage medium according to claim 11, wherein the at least one difference value comprises a distance difference value obtained by subtracting a first distance value between the two eyes of the user in the first image from a second distance value between the two eyes of the user in the preview image, the predetermined range corresponding to the distance difference value is a predetermined distance difference range, the step of prompting the user to move the electronic device comprises:
prompting the user to adjust a distance between the user and the electronic device according to the distance difference value when the distance difference value is not within the predetermined distance difference range.

13. The non-transitory storage medium according to claim 11, wherein the predetermined range corresponding to the horizontal coordinate difference value is a predetermined horizontal coordinate difference range, the predetermined range corresponding to the vertical coordinate difference value is a predetermined vertical coordinate difference range, the step of prompting the user to move the electronic device comprises:
prompting the user to move the electronic device according to the horizontal coordinate difference value when the horizontal coordinate difference value is not within the predetermined horizontal coordinate difference range; and
prompting the user to move the electronic device according to the vertical coordinate difference value when the vertical coordinate difference value is not within the predetermined vertical coordinate difference range.

14. The non-transitory storage medium according to claim 11, wherein the at least one difference value comprises an orientation angle difference value obtained by calculating an angle between a first line connecting the first coordinates of the two eyes of the user and a second line connecting the second coordinates of the two eyes of the user, the predetermined range corresponding to the orientation angle difference value is a predetermined orientation angle difference range, the step of prompting the user to move the electronic device comprises:
prompting the user to rotate the electronic device according to the orientation angle difference value when the orientation angle difference value is not within the predetermined orientation angle difference range.

15. The non-transitory storage medium according to claim 11, wherein the at least one difference value comprises an orientation angle difference value obtained by subtracting a first orientation angle of the electronic device relative to a predetermined orientation obtained when the front camera device captures the first image from a second orientation angle of the electronic device relative to the predetermined orientation obtained when the rear camera device captures the preview image, the predetermined range corresponding to the orientation angle difference value is a predetermined orientation angle difference range, the step of prompting the user to move the electronic device comprises:
prompting the user to rotate the electronic device according to the orientation angle difference value when the orientation angle difference value is not within the predetermined orientation angle difference range.

* * * * *